United States Patent [19]

Klinedinst et al.

[11]  4,219,443

[45]  Aug. 26, 1980

[54] METHOD OF PREPARING A CATHODE CURRENT COLLECTOR FOR USE IN AN ELECTROCHEMICAL CELL

[75] Inventors: Keith A. Klinedinst, Marlborough, Mass.; Francis G. Murphy, Tiverton, R.I.

[73] Assignee: GTE Laboratories Incorporated, Waltham, Mass.

[21] Appl. No.: 971,571

[22] Filed: Dec. 20, 1978

[51] Int. Cl.$^2$ ................. H01M 4/08; H01M 6/14
[52] U.S. Cl. ................. 252/425.3; 427/115; 429/196
[58] Field of Search ............ 252/425.3; 429/196, 429/42; 427/115, 122

[56] References Cited

U.S. PATENT DOCUMENTS

| | | | |
|---|---|---|---|
| 3,432,355 | 3/1969 | Niedrach et al. | 429/42 |
| 3,438,817 | 4/1969 | Short et al. | 429/42 |
| 3,922,174 | 11/1975 | Heller | 429/196 |
| 3,926,669 | 12/1975 | Auborn | 429/199 |
| 4,012,564 | 3/1977 | Auborn | 429/196 |
| 4,020,240 | 4/1977 | Schlaikjer | 429/196 |
| 4,043,933 | 8/1977 | Breault et al. | 252/425.3 |

Primary Examiner—P. E. Konopka
Attorney, Agent, or Firm—David M. Keay

[57] ABSTRACT

Disclosed is a primary electrochemical cell having an improved cathode current collector and a method for making the current collector. The cell comprises an oxidizable active anode material; and electrolytic solution comprising a reducible soluble cathode and an electrolyte solute dissolved therein; and a cathode current collector comprising a layer of finely-divided catalyst for reducing the solvent, bonded to an inert, electrically-conductive substrate. Preferably, a bonding layer, comprising a finely-divided polymer and a minor amount of conductive material, bonds the catalyst layer to the substrate. The bonding and catalyst layers preferably can be formed by sequentially applying respective dispersions thereof to the substrate, drying, and heating to bond the materials. Soluble cathode cells employing cathode current collectors of the type described have exceptionally rapid discharge properties.

8 Claims, 9 Drawing Figures

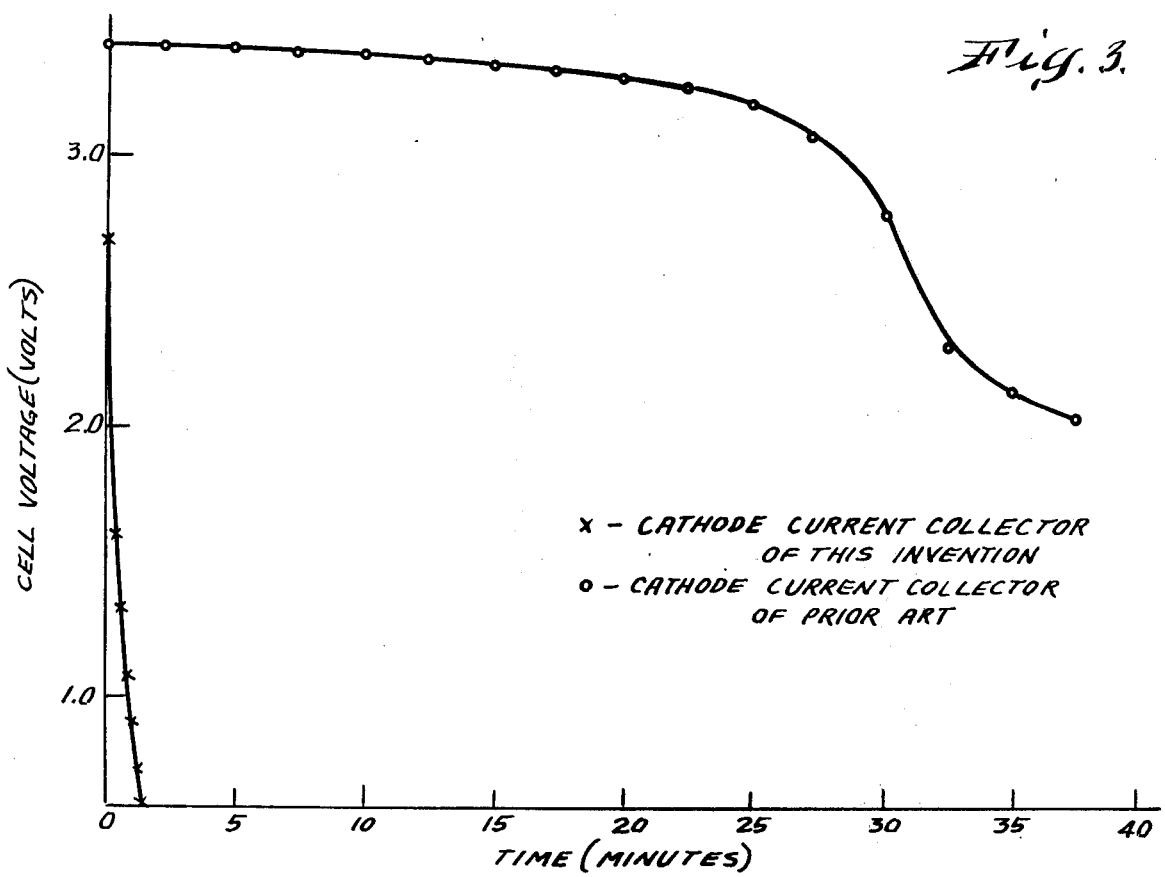
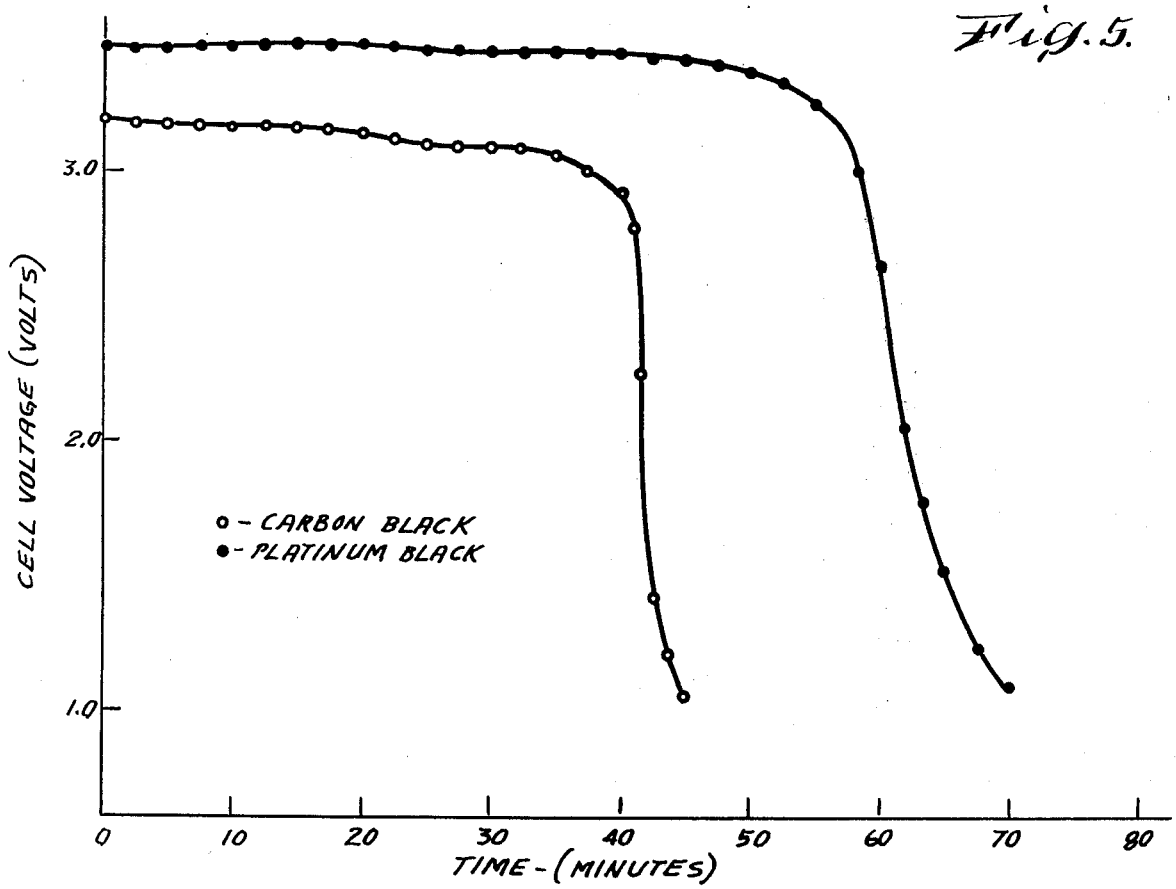

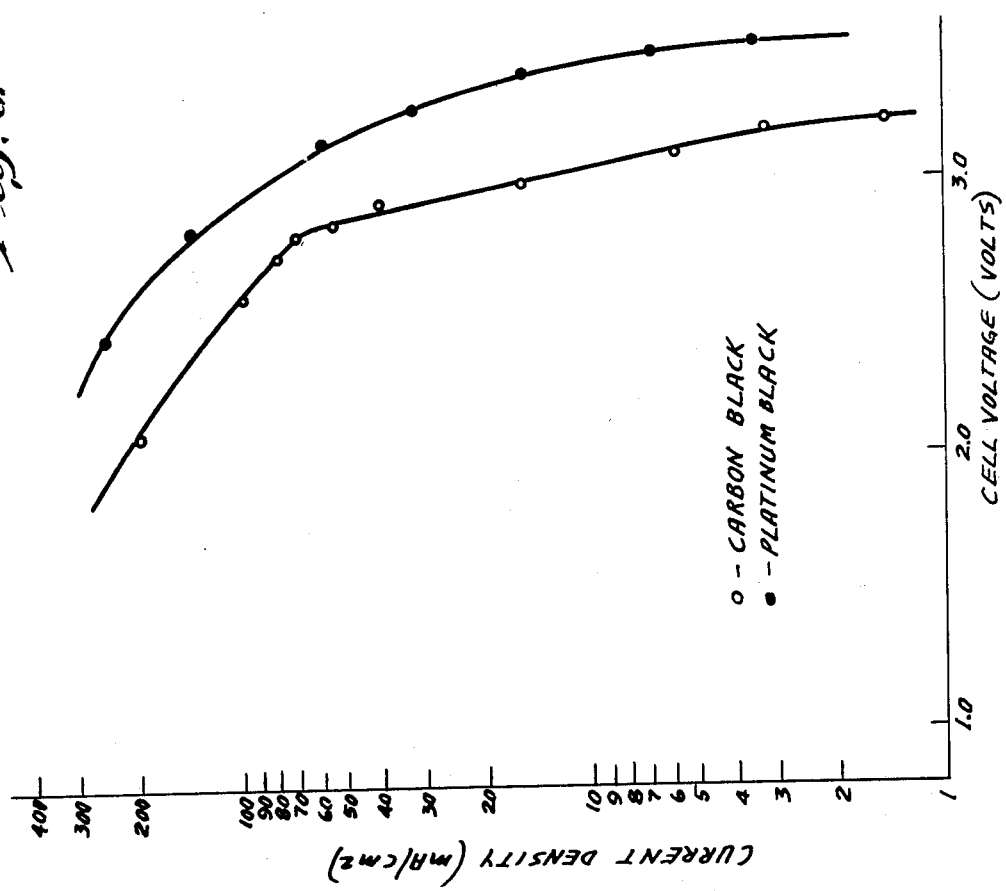
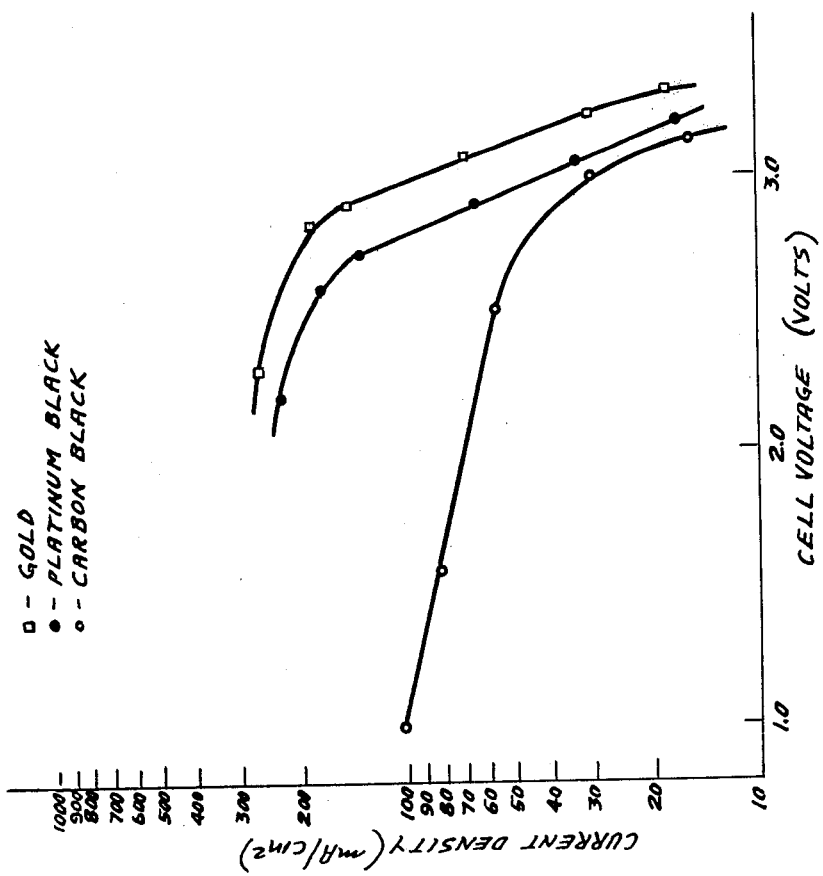

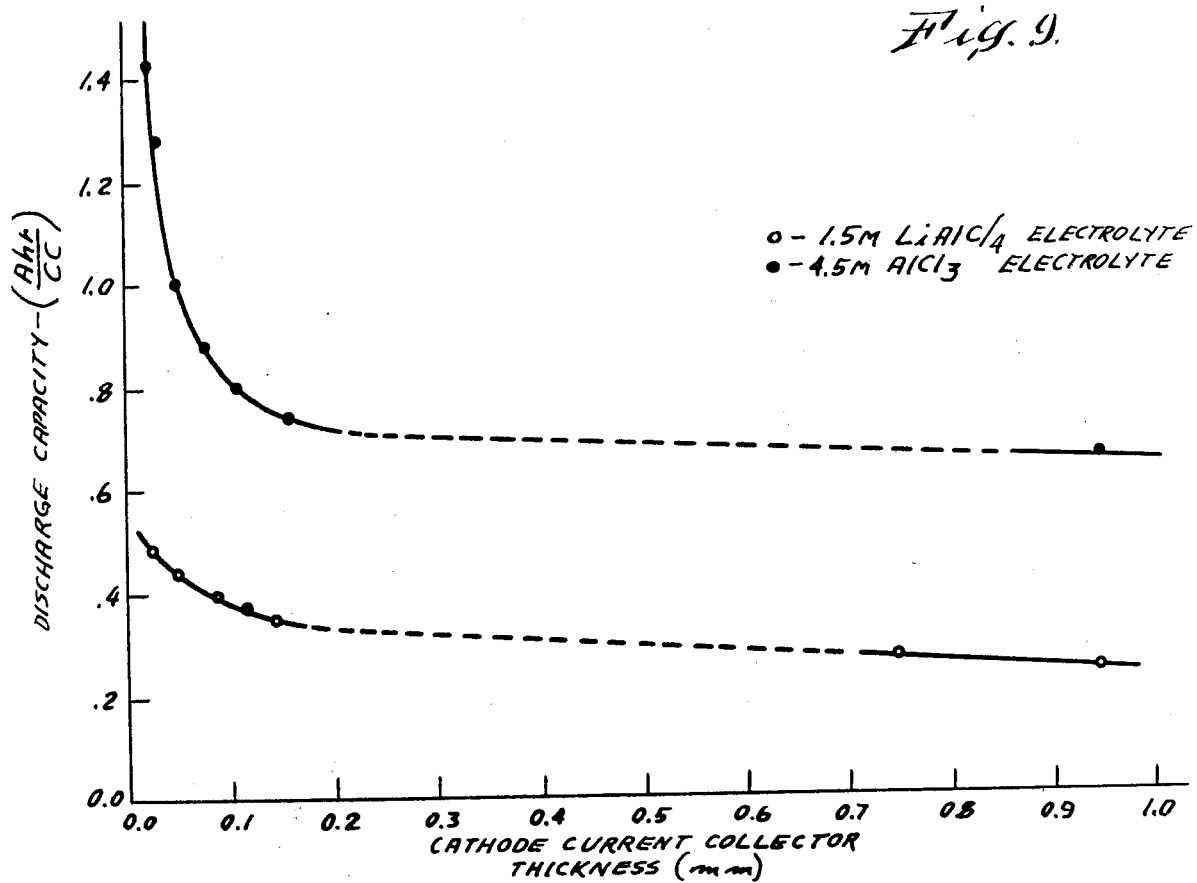

METHOD OF PREPARING A CATHODE CURRENT COLLECTOR FOR USE IN AN ELECTROCHEMICAL CELL

FIELD OF THE INVENTION

The present invention relates to primary electrochemical cells capable of discharging rapidly and more particularly to cells of this type having an oxidizable active anode material, a cathode current collector, and an electrolytic solution comprising a reducible soluble cathode and an electrolyte solute dissolved therein.

BACKGROUND OF THE INVENTION

To understand the improvements provided by this invention, it will be helpful to understand that primary electrochemical cells are a class of voltaic cells, and that voltaic cells are those electrochemical cells in which chemical changes produce electrical energy. This distinguishes voltaic cells from electrolysis cells in which electrical energy from an outside source produces chemical changes within the cell. Primary cells cannot be conveniently recharged, and are discarded after a single exhaustion of their component elements since return to full power requires replacement of the exhausted chemical constituents. These cells are distinguished from another class of voltaic cells, namely, secondary cells, in which the exhausted cell is charged by passing electrical current from an outside source through it in the reverse direction. In the course of the voltaic cell reaction, current leaves the cathode and enters the anode, thus the cathode is the positive electrode and the anode is the negative electrode.

A particularly effective class of primary cells which employs soluble or liquid cathodes, as opposed to the more conventional solid cathode cells, has undergone rapid development in recent years. In these cells, the active cathode material is usually a fluid solvent for an electrolyte solute which provides conductivity. The active anode for these cells is usually lithium or other highly electropositive metal. During discharge, the solvent is electrochemically reduced on a cathode current collector to yield ions, e.g. halogen ions, which react with metallic ions from the anode to form soluble metal salts, e.g. metal halides. The cathode current collector does not take part in the reaction itself, but simply provides a support on which the reaction can occur, supplying electrons given up during the oxidation of the anode material.

The art has recognized that a wide variety of metals and semiconductor materials can be employed to make up the cathode current collector or to provide a catalytically active surface thereon. For example, in U.S. Pat. Nos. 3,926,669 and 4,012,564, eighteen different cathode current collectors are disclosed in the examples. The discharge current densities and open circuit potentials vary widely for these different materials, with gold being apparently a very desirable material. In U.S. Pat. No. 3,922,174, gold, carbon and $(C_4F)_n$ are disclosed as catalytically active materials when used on the cathode current collector. In Example XI, a cathode current collector is disclosed having a gold plated titanium substrate.

Batteries for certain military applications, such as torpedo propulsion, must be capable of being discharged very rapidly, and provide large amounts of electrical energy within a relatively short period of time. The recently-developed liquid cathode cells of the type disclosed above have many significant advantages which make their use attractive for most applications where high performance is desired. To date, all such cells used in military and civilian applications have contained carbon black as the active catalyst on the cathode current collector; and, carbon black has demonstrated its ability to function in most situations. However, some cases demand greater current densities, without unduly increasing the cell volume. To meet this need, improved cathode current collectors must be developed.

Additional improvement could be obtained if there was some effective means for forming thin cathode current collectors of the more active catalyst materials, or for utilizing gold or other active catalyst materials in a more effective manner. Cathode current collectors have been made previously by extruding carbon black onto various substrates down to a thickness of 500 micrometers. However, it has been difficult to make thinner current collectors. Thus, the prior art has employed finely-divided carbon black in making cathode current collectors, and has, as previously noted, taught the use of solid gold for use on cathode current collectors; however, it does not suggest either the use of layers of finely-divided gold or other like catalysts other than carbon black, bonded to a less catalytically active substrate, or the use of layers of carbon black less than 500 micrometers thick bonded to a less catalytically active substrate.

SUMMARY OF THE INVENTION

It is an object of the present invention to provide a primary electrochemical cell with an improved cathode current collector.

It is a more specific object of the present invention to provide a primary electrochemical cell with an improved cathode current collector which enables high discharge rates and high current densities.

It is another specific object of the present invention to provide an electrochemical cell with an improved cathode current collector having a surface of finely-divided catalyst material bonded thereto which enables high discharge rates and high current densities.

It is yet another specific object of the present invention to provide a primary electrochemical cell with an improved cathode current collector which is thin and has a surface of finely-divided catalyst material bonded thereto which enables high discharge rates and high current densities.

It is another object of the present invention to provide a method for making an improved cathode current collector for primary electrochemical cells.

It is yet another specific object of the present invention to provide a method for making an improved cathode current collector for primary electrochemical cells which enables high discharge rates and high current densities.

It is a further specific object of the present invention to provide a method for making an improved cathode current collector for primary electrochemical cells which has a surface of finely-divided catalyst material bonded thereto which enables high discharge rates and high current densities.

It is yet a further specific object of the present invention to provide a method for making an improved cathode current collector for primary electrochemical cells which has a surface of finely-divided catalyst bonded to a thin substrate which enables high discharge rates and high current densities.

These and other objects are accomplished according to the present invention which provides an electrochemical cell with an improved cathode current collector, and a process for making the improved current collector. The primary electrochemical cell comprises: (a) an oxidizable active anode material; (b) a cathode current collector comprising a layer of finely-divided catalyst for reducing the soluble cathode bonded to an inert, electrically-conductive substrate; and (c) an electrolytic solution, in contact with the anode and cathode current collector, comprising a reducible, soluble cathode and an electrolyte solute dissolved therein. In the case where the catalyst comprises carbon black, the cathode current collector will be less than 400 micrometers thick, and will preferably be less than this thickness for all catalyst materials. The process comprises: (a) providing an inert, electrically-conductive substrate; (b) preparing a catalyst dispersion comprising a liquid vehicle, a finely-divided catalyst and a minor amount, based on the weight of the catalyst, of a thermoplastic polymer; (c) forming a catalyst layer on the substrate by applying the catalyst dispersion thereto and removing the liquid vehicle; and (d) heating the substrate and the catalyst layer at a temperature and for a time effective to fuse said catalyst layer and substrate into a unitary cathode current collector.

BRIEF DESCRIPTION OF THE DRAWINGS

The present invention will be described in detail below and is illustrated in important detail in the attached drawings wherein:

FIG. 3 is a graph comparing the variation of cell voltage with time of discharge for another cell according to this invention, to a cell having a gold plated titanium cathode as taught in U.S. Pat. No. 3,922,174;

FIG. 4 is a graph comparing the variation of current densities with cell voltage for two cells according to the present invention to a cell having a standard carbon black cathode current collector;

FIG. 5 is a graph showing the discharge curves for cells prepared according to Examples IV and V;

FIG. 6 is a graph showing the polarization curves for cells prepared according to Examples IV and V;

FIG. 9 is a graph showing the discharge capacities per unit cathode volume as a function of cathode current collector thickness for cells prepared in Example VI.

DETAILED DESCRIPTION OF THE INVENTION

Figure 1:
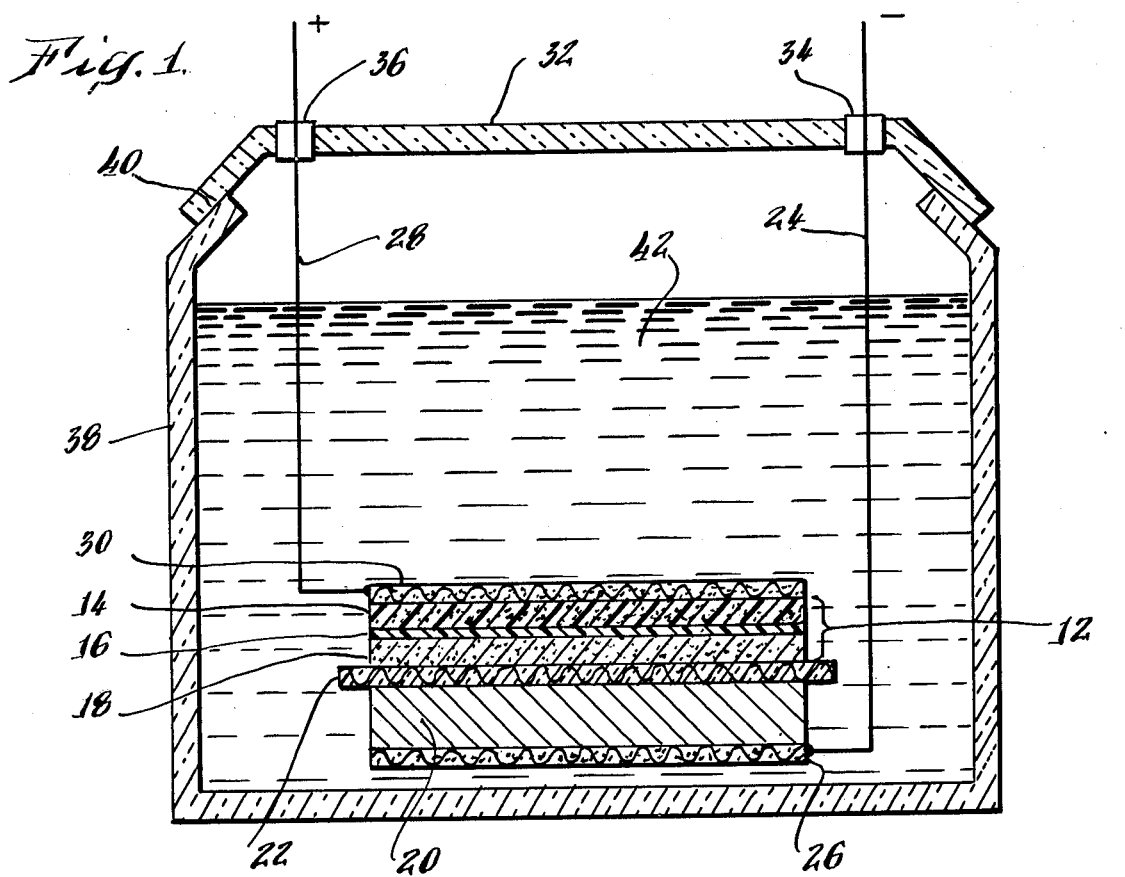
FIG. 1 is a schematic representation, in cross section, of a primary electrochemical cell comprising the improved cathode current collector of the present invention.

The improved cathode current collector provided by the present invention has a broad range of utilities with respect to the types of cells which it can be employed in, but is preferably employed in those cells designed to provide rapid discharge at high current densities.

As used throughout this specification and claims, when an electrochemical cell is designated to have a particular anode or cathode material, that anode or cathode, or anode or cathode material, shall mean the electrochemically active component, and not the non-consumable electrically conducting, inert or catalytic cathode or anode current collectors, as the case may be. Such an electrode may be in contact with, or form a part of, a suitable substrate, in the case of the anode or will be a fluid in the case of the cathode. The catalyst materials defined herein are active only in the sense that they actively catalyze the reduction of the soluble cathode. The catalysts are not themselves reduced under the desired cell operating conditions.

The improved cathode current collector of this invention comprises a finely-divided catalyst, for reducing the soluble cathode, bonded to an inert, electrically-conductive substrate. The cathode current collectors are preferably thin to permit higher surface areas per unit volume. Typically, the cathode current collectors will be from 55 to 950 micrometers in thickness, and most preferably will be from 55 to 400 micrometers. In the case of carbon black or other carbon compounds, the thickness will be less than 400 micrometers. The use of a finely-divided catalyst on the cathode current collector surface permits high rates of cell discharge at high current densities.

Among the suitable catalyst materials according to the present invention, are gold, platinum, carbon black, nickel oxide, and copper sulfide, as well as those materials identified as suitable cathode current collector surface layers in U.S. Pat. No. 3,922,174, the disclosure of which is hereby incorporated by reference. The catalyst material is most active when finely divided, and will preferably be fine enough such that 95% passes through a 100 mesh Tyler sieve, and most preferably 100% will pass through a 100 mesh Tyler sieve. Thus, whenever the term "finely-divided" is used in this description, it will mean particulate materials where at least 95% passes through a 100 mesh Tyler sieve. The particle size distributions for all finely-divided components of the cathode current collector will preferably be the same, but can vary as the requirements of a particular cell dictate. One practical limitation on the lower size limit will occur in the case where a porous substrate is employed as a support. In such a case, when it is desired to retain the pores free from catalyst or bonding materials, the particles should be larger than the pores in the substrate. There are circumstances, however, where the presence of particles in the adjacent layer may be advantageous, such as to cause a better interlock between layers.

One embodiment of cathode current collector according to this invention is schematically shown in FIG. 1 in one form of cell made in accordance with the present invention. In FIG. 1, there is shown a cathode current collector, generally designated 12, which is made in three layers 14, 16 and 18. Layer 14 is an inert, electrically-conductive substrate, layer 16 is a bonding layer, and layer 18 is a catalyst layer comprising finely-divided catalyst for reducing the soluble cathode. The cathode current collector 12 is preferably separated from the oxidizable anode 20 by a porous separator 22. The anode is electrically connected to lead wire 24 by current collector 26. Likewise, cathode current collector 12 can be electrically connected to lead wire 28 by member 30, where required. Lead wires 24 and 28 pass through cell cover 32 through seals 34 and 36. Cell cover 32 is sealed to the main cell container 38 by means of sealing engagement 40. Where the cell container 38 and cover 32 are glass, the sealing engagement 40 can be by conventional ground glass mating surfaces. The interior of the cell container 38 is filled with the electrolytic solution 42 which comprises a fluid, reducible soluble cathode and an electrolyte solute dissolved therein.

The electrically conductive substrate 14 of the cathode current collector 12 can be made of any of those materials suggested for cathode current collectors, such as those materials taught in U.S. Pat. No. 4,020,240, the disclosure of which is hereby incorporated by reference. Representative substrate materials are nickel, nickel alloys, such as monel, stainless steel, zinc, tungsten, titanium and the like. Preferably, the substrate will be porous and/or be a thin foil. Suitable porous materials have from 15 to 90%, preferably from 50 to 80%, void space. The void spaces should be controlled to be as uniform in size as possible and be of the open-cell as opposed to closed-cell type. Desirably, the voids will have diameters of from 8 to 12 micrometers. Typically, foils will be from 25 to 500 micrometers in thickness, with those under 175 micrometers being preferred.

The catalyst layer 18 is preferably bonded to the substrate 14 by means of an intermediate bonding layer 16. The catalyst layer 18 will comprise a finely-divided catalyst as described above and a minor amount of a finely-divided thermoplastic polymer. The term "thermoplastic polymer" is used in its broad sense, and any polymeric bonding material which is inert in the cell and which passes through a thermoplastic state, whether or not it finally sets or cures, is included within the term "thermoplastic polymer". Representative materials include polyethylene, polypropylene, fluorinated ethylene propylene and polytetrafluoroethylene, with polytetrafluoroethylene being preferred. As will be described in more detail below, the mixture of finely-divided catalyst and polymer are fused into a unitary layer. The catalyst layer will typically be from 25 to 400 micrometers for catalysts other than carbon black and will be less than 400 micrometers thick for carbon black and preferably for the other catalysts. Thicknesses of less than 200 micrometers are most preferred for all catalyst materials.

The catalyst layer 18 can be in direct contact with the substrate layer 14, but is preferably bonded to it by means of an intermediate bonding layer 16 which preferably comprises finely-divided thermoplastic polymer and a minor amount, based on the weight of the polymer, of a finely-divided inert, electrically-conducting material. The polymer can be any of those defined above, and again is preferably polytetrafluoroethylene. The electrically-conducting material can be any suitable material such as carbon black or graphite and can be any of the compatible materials suitable for the substrate. The bonding layer will typically be from 5 to 50 micrometers, and preferably 10 to 15 micrometers, in thickness.

An important aspect of the present invention is the provision of a method for making the cathode current collector 12. According to the method, the catalyst layer 18 and, if desired, the bonding layer 16, are formed on the substrate 14 by sequentially applying liquid dispersions of their component parts to the surface of the substrate 14, removing the liquid vehicle, and heating the resulting layered mass to soften the polymer and bond the materials into a fused, unitary structure.

In the embodiment where the substrate 14 is porous, the substrate is positioned between a first zone at a first pressure and a second zone at a second, high pressure. This is typically accomplished by positioning the porous substrate over a source of vacuum, such as a typical laboratory filtering apparatus. Dispersions for forming the bonding and catalyst layers are then introduced into the second zone, forcing the solid particles into contact with the surface of the substrate 12 and removing the liquid vehicle component of the dispersion by forcing it through the substrate. Thus, in the exemplary situation where the pressure in the first zone is reduced from atmospheric and the pressure in the second zone is atmospheric, the layers will be applied by what in effect is a filtering operation.

In the embodiment where the substrate 14 is a non-porous metal sheet or foil, the catalyst layer and the bonding layer are formed by alternately spraying the appropriate dispersion onto the substrate and drying until the desired thickness for that layer is built up. Where a bonding layer is to be employed in this embodiment, the bonding layer is preferably heated to fuse the polymer prior to applying the catalyst layer. The surface of the substrate is preferably roughened such as by etching, sandblasting or rubbing with an abrasive prior to coating.

The catalyst layer dispersion is prepared by mixing and dispersing a liquid vehicle with finely-divided catalyst and a minor amount, based on the weight of the catalyst, of a thermoplastic polymer. The liquid vehicle can be any material which can by itself or with the aid of a surfactant or dispersant, form a stable dispersion of the particulate components for a period of time effective to cast a uniform layer. Water, ethanol, and isopropanol are exemplary of suitable liquid vehicles. Usually, an aqueous medium with a suitable surfactant will be preferred. One surfactant which has been found effective when used in water to suspend gold, platinum, polytetrafluoroethylene, and the like, is Rohm and Hass Triton X-100, which is isooctylphenoxypolyethoxyethanol. To effectively disperse the materials, high energy mixing is generally preferred. For example, ultrasonic mixing has been found suitably effective. However, any effective mixing means can be employed.

Where a bonding layer is desired, a bonding layer dispersion is prepared and applied prior to application of the catalyst layer. The bonding layer dispersion comprises a liquid vehicle, finely-divided thermoplastic polymer, and a minor amount, based on the weight of the polymer, of an inert, electrically-conductive material. The vehicle and polymer can be the same as for the catalyst layer depending on the nature of the finely-divided materials in the dispersions. The bonding layer dispersion can be mixed to obtain a good dispersion and then applied in the same manner as the catalyst layer dispersion.

The anode 20 is an oxidizable material and is preferably lithium metal. Other oxidizable anode materials contemplated for use in the cells of this invention include other alkali metals such as sodium, potassium, cesium and rubidium; the alkaline earth metals such as beryllium, magnesium, calcium, strontium and barium; the Group IIIA metals such as aluminum, gallium, indium and thallium; the Group IVA metals such as tin and lead; and transition metals such as scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold and mercury. The anode may be constructed of the oxidizable material in contact with a metal grid 26. The grid for a lithium anode, for example, may be made of nickel, nickel alloys (such as monel), stainless steel, silver or platinum.

The electrolytic solution 42 comprises a reducible, soluble cathode solvent and an electrolyte solute dissolved therein. Among the useful soluble cathodes are fluid oxyhalides, non-metallic oxides, non-metallic halides and mixtures thereof such as phosphorus oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), thionyl chloride ($SOCl_2$), sulfuryl chloride ($SO_2Cl_2$), nitryl chloride ($NO_2Cl$), nitrosyl chloride (NOCl), nitrogen dioxide ($NO_2$), sulfur monochloride ($S_2Cl_2$) and sulfur monobromide ($S_2Br_2$). Each of the above can be used together or separately.

It is preferred that the soluble cathode be dried prior to use. In the case of phosphorus oxychloride, this is accomplished by boiling this soluble cathode material with clean lithium shot for twelve hours at room temperature under an argon atmosphere. The soluble cathode material is then distilled at atmospheric pressure and the material which boils between 105° C. and 106° C. collected. The soluble cathode thus prepared has a specific conductance of less than $7 \times 10^{-7}$ Mhos/cm. Other soluble cathodes can be dried in an analogous manner or by techniques known in the art. Since these soluble cathodes are electrochemically reducible, but otherwise relatively non-reactive, and the reaction products of such reduction are relatively non-reactive, cells can be constructed with a wide range of anode and cathode materials, particularly anode materials which themselves are highly reactive, such as, for example, lithium.

Typically, these soluble cathodes have low conductivities and must have an electrolyte solute dissolved therein to raise their conductivities. The typical solute provides at least one anion of the general formula $X^-$, $MX_4^-$, $M'X_6^-$, and $M''Cl_6^-$, where M is an element selected from the group consisting of aluminum and boron; M' is an element selected from the group consisting of phosphorus, arsenic, and antimony; M" is an element selected from the group consisting of tin, zirconium, and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$) and hexachloroantimonates ($SbCl_6^-$). Examples of solutes yielding anions $M''Cl_6^{--}$ are: hexachlorostannates ($SnCl_6^{--}$), hexachlorozirconates ($ZrCl_6^{--}$) and hexachlorotitanates ($TiCl_6^{--}$). Solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), perchlorates ($ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; an alkaline earth metal, such as magnesium, calcium, strontium, and barium; or a lantanide rare earth element, such as lanthanum, terbium, neodymium, cerium, europium and samarium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium $(CH_3)_4+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation such as phosphorus oxydichloride ($POCl_2^+$) in the case of a phosphorus oxychloride based electrolytic solution, $SOCl^+$, and $SO_2Cl^+$, etc.

The solute for a particular cell can be chosen to yield a combination of any of the anions and cations listed above; however, the electrolyte must contain at least $10^{-3}$ moles per liter of cation and at least $10^{-3}$ moles per liter of anion. Preferably, at least $10^{-1}$ moles per liter of cation and at least $10^{-1}$ mole per liter of anion are present. It is also preferred that a dried solute be used or that the electrolytic solution be dried after it is prepared.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithim hexafluoroantimonate, lithium hexachloroantimonate, lithium hexachlorostannate, lithium hexachlorozirconate, lithium hexachlorotitanate and lithium chlorosulfate. Other preferred compounds are Lewis acids, particularly aluminum chloride ($AlCl_3$), boron trichloride ($BCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($ZnCl_2$) and zirconium chloride ($ZnCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium, and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as a result of the reaction of a Lewis acid with a Lewis base dissolved in the solvent. For example, lithium chloride, LiCl, a Lewis base, will react with $AlCl_3$ to form $LiAlCl_4$, which dissociates in part to solvated $Li^+$ and $AlCl_4^-$.

Although not required for all of the cells of this invention, a suitable separator 22 can be employed to prevent the reaction of anode and cathode current collector materials when no electrical current flows through the external circuit. A separator prevents the diffusion of cathode current collector material to the anode. When the cathode current collector material is soluble in the electrolyte, an ion selective separator which allows only a particular ion or group of ions to migrate between the anode and cathode may be used. Two major groups of ion selective separators are organic selectively permeable membranes and inorganic zeolites. A particularly useful membrane which permits the flow of lithium ions is perfluorinated hydrocarbon (membrane) sulfonate. If the cathode current collector material is not soluble in the electrolytic solution, or does not react spontaneously with the anode material, mechanical separators can be used. A wide variety of ceramic and plastic materials having small pore sizes are available. Examples of such materials include: alumina, beryllia, titania, porcelain, porous glass, fritted glass, glass mat, nonwoven porous tetrafluoroethylene and other fluorinated polymers, polypropylene and polyethylene.

The following examples are for the purpose of further illustrating and explaining the present invention, and are not to be taken as limiting in any regard. Unless otherwise indicated, all parts and percentages are by weight.

EXAMPLE I

Figure 2:
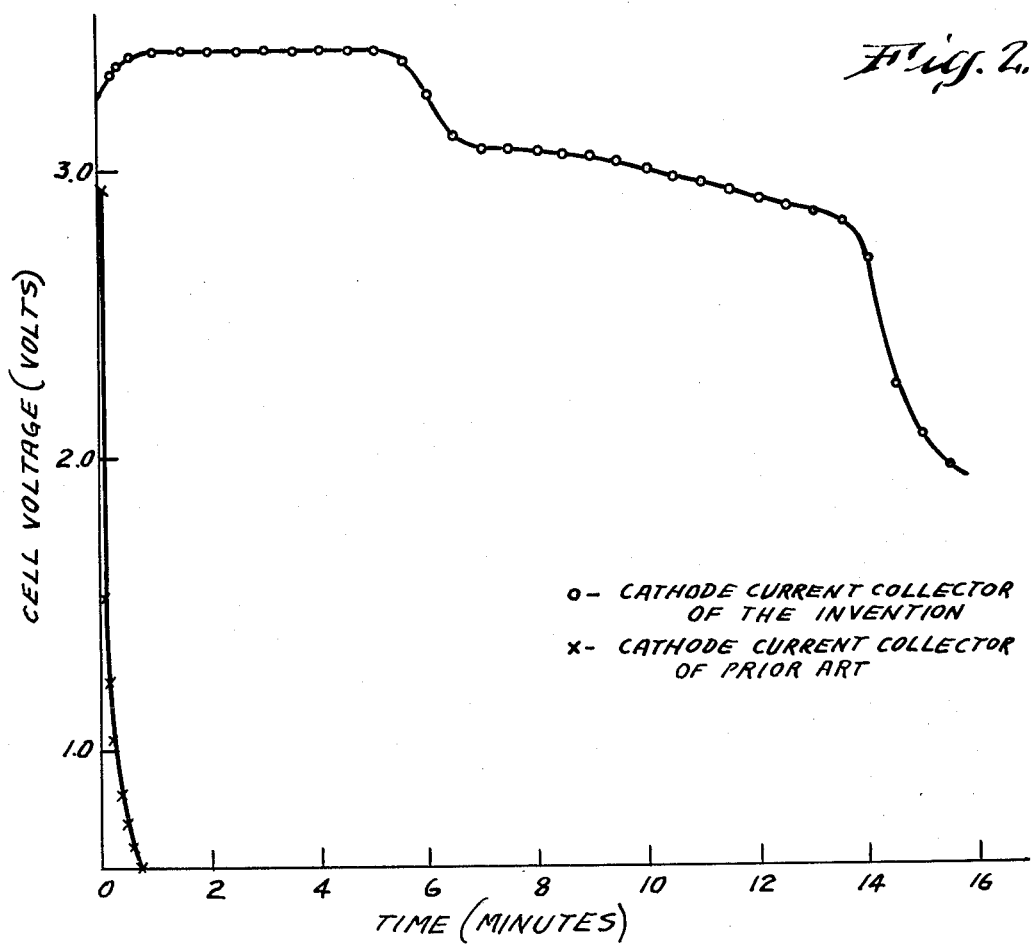
FIG. 2 is a graph comparing the variation of cell voltage with time of discharge for a cell according to this invention, to a cell having a gold plated titanium cathode as taught in U.S. Pat. No. 3,922,174.

A primary electrochemical cell according to the present invention is made having an improved cathode current collector comprising a finely-divided gold catalyst layer bonded to a porous nickel sheet as the substrate. The discharge curve for the cell which also employs a lithium metal anode and an electrolytic solution comprised of thionyl chloride ($SOCl_2$) and $LiAlCl_4$ is shown in FIG. 2.

To prepare the cathode current collector, a bonding layer dispersion is first prepared employing Dupont TFE-30 which is an aqueous dispersion of 0.2 micrometer average particle size of polytetrafluoroethylene. A quantity is used so as to provide 0.583 grams of solid polytetrafluoroethylene material. The bonding layer dispersion also includes 0.250 grams of Cabot Corporation Vulcan XC-72 325 mech Tyler sieve carbon black and 250 cc of distilled water to which 20 drops of a 1% aqueous solution of Triton X-100 surfactant is added. The solids, approximately 70% of which are the polytetrafluoroethylene and 30% of which are the carbon black, are dispersed ultrasonically. To form the bonding layer, 5 cc of the dispersion are applied to a 3.5 cm diameter circular piece of 70% porous nickel sheet which is positioned over a source of vacuum. A uniform bonding layer, approximately 10 micrometers thick, is formed.

Next a catalyst layer dispersion is formed, comprising 1.5 grams 100 mesh Tyler sieve gold powder, Dupont TFE-30 to provide 0.375 grams of polytertafluroethylene, and a solution of 10 cc water and 10 cc isopropanol. The solids are dispersed ultrasonically and the resulting dispersion is then filtered uniformly onto the substrate which now carries a thin bonding layer. The water and isopropanol vehicle is drawn off through the nickel substrate to leave a 500 micrometer thick catalyst layer. The layered cathode current collector assembly is washed with isopropanol, dried and heated in air for 15 minutes at 345° C. to fuse the polytetrafluoroethylene and form a unitary, dimensionally-stable assembly.

A 1 $cm^2$ piece was cut from the 3.5 cm diameter circular assembly and was tested in a wafer cell of the type shown schematically in FIG. 1. The cell contained a 0.030 inch thick lithium anode, a 0.005 inch thick porous glass separator, 1.5 M $LiAlCl_4$ dissolved in $SOCl_2$ as the electrolytic solution and nickel metal current collectors. The cell was discharged across a constant 200 ohm load. The resulting discharge curve is shown in FIG. 2. Also shown is the discharge curve obtained with a similar cell containing a cathode current collector such as is disclosed in Example XI of U.S. Pat. No. 3,922,174 to Heller and Auborn. Other than the cathode current collector, the two cells were identical. The results demonstrate the superiority of the cathode current collector prepared according to this invention.

EXAMPLE II

Another cell according to this invention, but having a cathode current collector comprising a porous substrate, a bonding layer and a catalyst of finely-divided platinum, was prepared. The discharge curve for this cell is shown in FIG. 3.

The entire cell, including the cathode current collector substrate and bonding layer was the same as in Example I, changing only the composition of the catalyst layer. To prepare the platinum catalyst layer, a dispersion was prepared comprising 0.500 grams of 200 mesh Tyler sieve platinum black, Dupont TFE-30 to provide 0.026 grams of polytetrafluoroethylene, and a solution of 10 cc water and 10 cc isopropanol using 20 drops of a 1% aqueous solution of Triton X-100 surfactant. After dispersing and applying the dispersion as described in Example I, the resulting 150 micrometer thick catalyst layer was rinsed with isopropanol to wash out the surfactant and then with water to remove the isopropanol prior to drying and fusing as done in Example I.

A 1 $cm^2$ piece of the cathode current collector was cut from the 3.5 cm diameter circular cathode and was tested in a wafer-type cell as in Example I, the cell being discharged across a constant 200 ohm load. The resulting discharge curve is shown in FIG. 3, along the discharge curve obtained with an otherwise identical cell containing a smooth platinum cathode such as was used in Example XI of U.S. Pat. No. 3,922,174 to Heller and Auborn. Again, the superiority of the cathode current collector prepared according to this invention is demonstrated.

EXAMPLE III

A series of lithium/thionyl chloride cells prepared as described in Examples I and II, employing cathode current collectors having gold and platinum catalyst layers were discharged across a series of constant loads ranging from 10 ohms to 200 ohms. The average (plateau) cell voltages and corresponding current densities for both gold and platinum cathode current collector cells are plotted in FIG. 4 along with similar data obtained with prior art carbon black cathodes (950 micrometers thick) in otherwise identical cells. Clearly, both the gold and platinum cathode cells perform much more efficiently than do the carbon cathode current collector cells. In particular, at any given current density, the cells containing the gold and platinum catalysts prepared according to this invention discharge at higher voltages than do otherwise identical cells containing carbon black cathode current collectors. Further, the limiting currents achievable with the gold and platinum catalyst cells are more than double that achievable with the standard carbon cathode current collector cells.

EXAMPLE IV

In this example, and the remaining examples to follow, primary electrochemical cells according to the present invention, are made having an improved cathode current collector comprising a finely-divided catalyst layer bonded to a non-porous, nickel foil, 0.005 inches (127 micrometers) thick.

To prepare the cathode current collector, the nickel foil is first roughened with emergy paper, cleaned and dried. A bonding layer dispersion prepared in the same manner as in Example I is then employed to build up a bonding layer by alternately spraying the dispersion onto the roughened metal substrate and drying. This spray coating procedure is repeated until the thickness of the bonding layer reaches 10 micrometers. Then, the spray-coated substrate is heated for 15 minutes at 345° C. to fuse the polytetrafluoroethylene.

Next, a catalyst layer dispersion is formed comprising 1.00 grams of Shawinigan acetylene black, 50% compressed; Dupont TFE-30 to provide 0.111 grams of tetrafluoroethylene; and 500 cc of distilled water to which 40 drops of a 1% aqueous solution of Triton X-100 surfactant was added. The solids are dispersed ultrasonically and the resulting dispersion is then alternately sprayed onto the bonding layer and dried to build up a 50 micrometer thick layer. The layered member was then heated in air for 15 minutes at a temperature of 345° C. to fuse the tetrafluoroethylene.

A cell was then prepared employing this cathode current collector and tested in the manner described in Example I except that the cell was discharged across a constant 500 ohm load. The resulting discharge curve is shown in FIG. 5.

Figure 7:
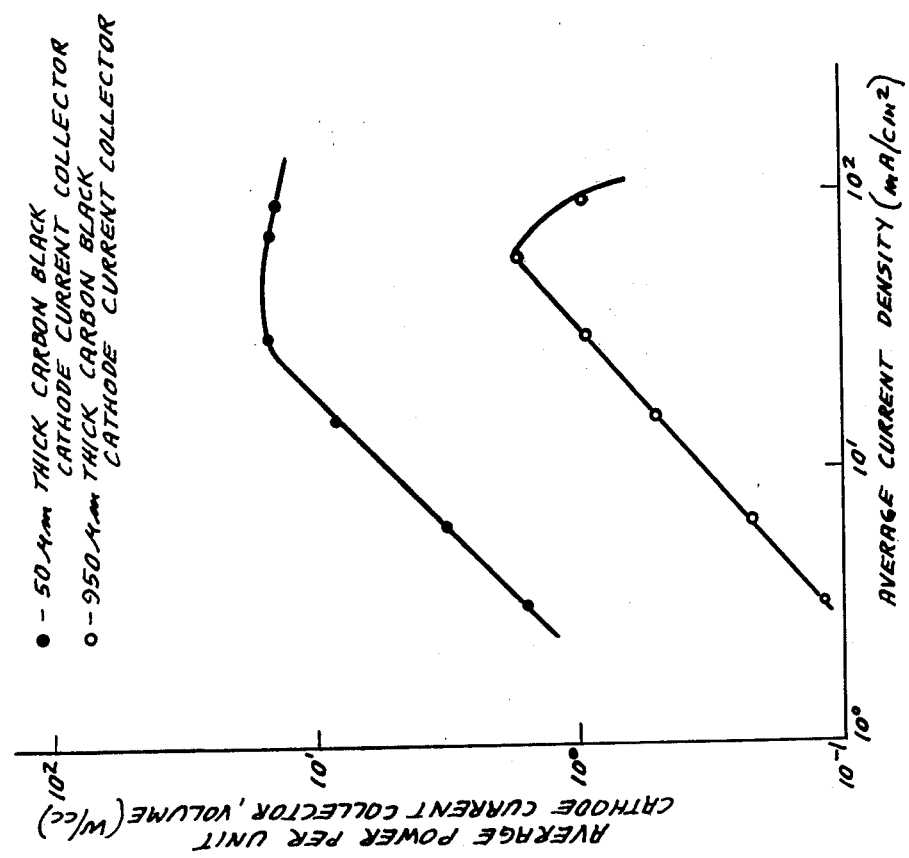
FIG. 7 is a graph comparing the power per unit cathode volume as a function of average current for a cell prepared according to this invention, to a prior art cell having a standard carbon black cathode current collector.

Further, a series of similar cells were prepared and discharged at average current densities ranging from about 3 to about 100 mA/cm². The resulting polarization curve, i.e., the log of the average current density versus average cell voltage is shown in FIG. 6. The same data are replotted in FIG. 7, where they are expressed as the logarithm of the average power per unit of cathode current collector volume versus the logarithm of the average current density. Also plotted in FIG. 7, is the corresponding curve obtained by the discharge of cells containing 950 micrometer thick carbon black cathode current collectors made by a prior art extrusion technique. As FIG. 7 shows, the average power per unit volume obtained with the thin cathode current collector made according to this invention is more than an order of magnitude greater than can be realized with the thicker cathode current collectors made by the prior art technique.

EXAMPLE V

Figure 8:
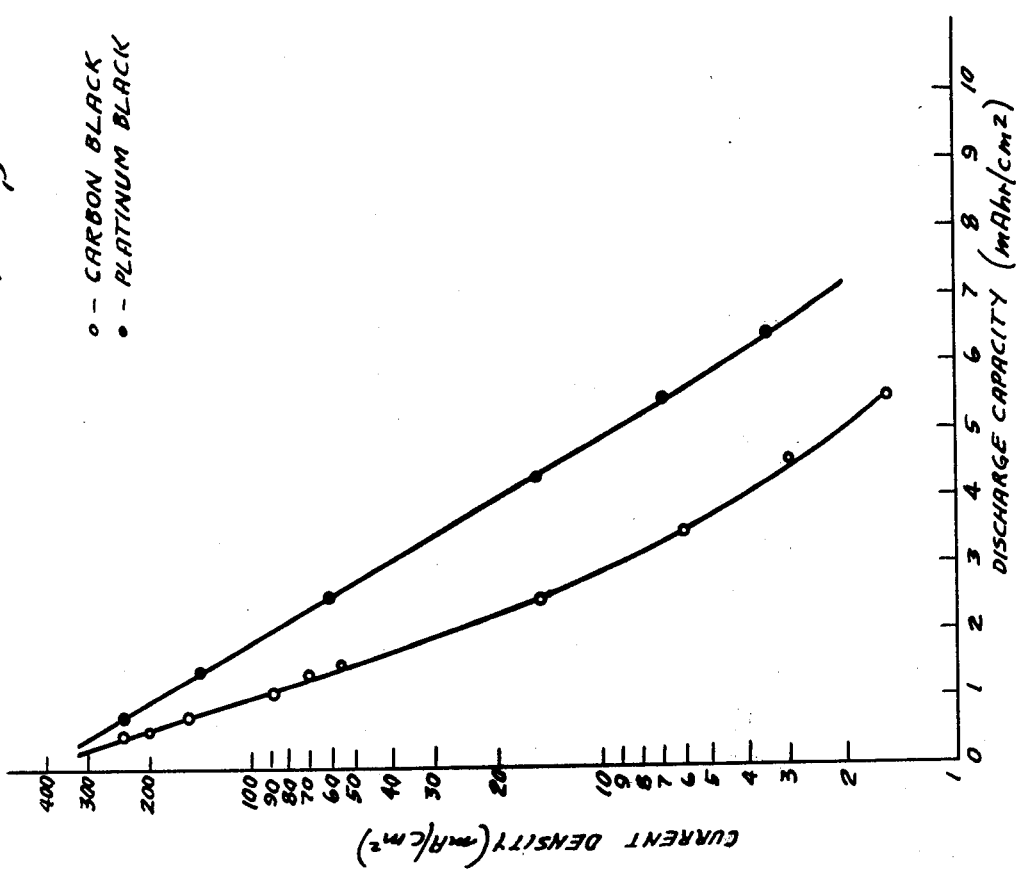
FIG. 8 is a graph showing the discharge capacities as a function of average current density for the cells prepared in Examples IV and V.

Another cell according to this invention but having a cathode current collector comprising metallic platinum bonded to a 0.005 inch thick nickel foil was prepared. FIGS. 5, 6 and 8 illustrate various discharge characteristics of this cell.

The entire cell, including the cathode current collector substrate and bonding layer was the same as in Example IV, changing only the composition of the catalyst layer. To prepare the platinum catalyst layer, a dispersion was prepared comprising 2.00 grams of 200 mesh Tyler sieve platinum black, Dupont TFE-30 to provide 0.222 grams of polytetrafluoroethylene, and 100 cc of distilled water using 10 drops of 1% aqueous solution of Triton X-100 surfactant. After preparing and applying the dispersion as described in Example IV, the resulting 50 micrometer thick catalyst layer was washed with isopropanol and distilled water prior to drying and fusing.

A cell was prepared and tested in the same manner as described in Example IV. The resulting discharge curve is shown in FIG. 5 along with the discharge curve for the thin carbon cathode current collector cell from Example IV. As shown, the thin platinum black cathode current collector cell discharged at a substantially higher voltage and for a substantially longer time than did the cell containing the thin carbon cathode current collector.

A series of similar cells were discharged at average current densities ranging from about 3 to about 100 mA/cm². The resulting polarization curve is shown in FIG. 6 along with the polarization curve of Example IV for the thin carbon cathode current collector cell. This comparison illustrates that over the entire range of average current densities, the average cell voltages obtained from the platinum cathode current collector cells are at least 300 mV higher than are the cell voltages corresponding to cells containing the thin carbon cathode current collectors.

In a further test, the discharge capacities measured with the thin platinum black cathode current collectors and the thin carbon black cathode current collector cells were measured as a function of average current density and are compared in FIG. 8. This comparison shows that, again over the entire range of current densities, the discharge capacities obtained with the thin platinum cathode current collector cells are between 40 and 70% greater than those realized with the cells containing the thin carbon cathode current collectors.

EXAMPLE VI

This examples illustrates the efficiency of discharge, expressed as discharge capacity per unit cathode current collector volume, by preparing and testing cells having cathode current collectors with carbon black catalyst layers of varying thicknesses between 25 micrometers and 150 micrometers.

A series of carbon black catalyst layer cathode current collectors were prepared as in Example IV except that the thickness of the carbon black layers was varied from about 25 micrometers to about 150 micrometers. To test these cells, a series of lithium/SOCl₂ cells were constructed as in Example IV, except that some of the cells contained 1.5 M LiAlCl₄ in SOCl₂ as the electrolyte solution while other cells contained 4.5 M AlCl₃ in SOCl₂ as the electrolyte. These cells were all discharged at a current density of about 30 mA/cm², and the resulting discharge capacities per unit cathode current collector volume are plotted as a function of cathode thickness in FIG. 9. Also shown are the capacities obtained with cells containing 750 and 950 micrometer thick carbon black cathode current collectors prepared according to the prior art technique.

As FIG. 9 illustrates, with both electrolytes the efficiency of discharge expressed as discharge capacity per unit cathode current collector volume, increases steadily with the decreasing cathode current collector thickness. The most striking effect is observed with the 4.5 M AlCl₃ electrolyte solution wherein, with a catalyst layer thickness of 25 micrometers, the discharge efficiency is more than twice as great as measured in cells with the relatively thick cathode current collectors of the prior art.

EXAMPLE VII

Another cell according to this invention but having a cathode current collector comprising a nickel oxide catalyst layer on a 0.005 inch thick nickel foil was prepared.

The entire cell, including the cathode current collector substrate and bonding layer was the same as in Example IV, changing only the composition of the catalyst layer.

To prepare the nickel oxide catalyst layer, a dispersion was prepared comprising 2.500 grams of 100 mesh Tyler sieve non-stoichiometric nickel oxide powder, Dupont TFE-30 to provide 0.277 grams of polytetrafluoroethylene, and 250 cc distilled water using 20 drops of a 1% aqueous solution of Triton X-100 surfactant. After preparing and applying the dispersion as in Example IV, the resulting 40 micrometer thick catalyst layer was rinsed with distilled water prior to drying and fusing.

A lithium/thionyl chloride cell was constructed and discharged as in Example IV. It discharged at an average current density of about 1.5 mA/cm$^2$ with an average voltage of about 3.14 volts. The discharge lasted for about 11 minutes.

EXAMPLE VIII

Another cell was prepared according to the present invention, having a cathode current collector comprising a copper sulfide (CuS) catalyst layer bonded to a 0.005 nickel substrate.

The entire cell, including the cathode current collector substrate and bonding layer was the same as in Example IV, changing only the composition of the catalyst layer. To prepare the copper sulfide catalyst layer, a dispersion was prepared comprising 2.50 grams of 100 mesh Tyler sieve copper sulfide, Dupont TFE-30 to provide 0.277 grams of polytetrafluoroethylene, and 250 cc of distilled water using 20 drops of a 1% aqueous solution of Triton X-100 surfactant. After preparing and applying the dispersion as described in Example IV, the resulting 40 micrometer thick catalyst layer was rinsed with distilled water prior to drying and fusing.

A lithium/thionyl chloride cell was constructed as in Example IV but containing the cathode current collector prepared according to this example. It was discharged as in Example IV at an average current density of about 1.5 mA/cm$^2$ with an average discharged voltage of about 3.33 volts. The discharge lasted for about 7 minutes.

The above disclosure is for the purpose of explaining the present invention to those skilled in the art and is not intended to describe all those obvious modifications and variations of the invention which will become apparent upon reading. Applicants do intend, however, to include all such obvious modifications and variations within the scope of the invention which is defined by the following claims.

What is claimed is:

1. A process for preparing a cathode current collector for use in a primary electrochemical cell comprising an oxidizable anode material; a cathode current collector comprising a layer comprising finely-divided catalyst for reducing the soluble cathode; and an electrolyte solution, in contact with the anode and cathode current collector, comprising a reducible soluble cathode and an electrolyte solute; wherein the process comprises:

positioning a porous, inert, electrically-conductive substrate between a first zone at a first pressure and a second zone at a second, higher pressure;

preparing a bonding layer dispersion comprising a liquid vehicle, a finely-divided thermoplastic polymer and a minor amount, based on the weight of the polymer, of an inert, electrically-conductive material;

preparing a catalyst layer dispersion comprising a liquid vehicle, a finely-divided catalyst and a minor amount, based on the weight of the catalyst, of a thermoplasticpolymer;

forming a bonding layer on the substrate by applying the bonding layer dispersion to the surface of the substrate in the second zone and forming a catalyst layer on the porous substrate by applying the catalyst layer dispersion to the bonding layer dispersion, the solid particles of the dispersions being forced against the substrate and the liquid being forced through the substrate; and heating the substrate, the bonding layer, and the catalyst layer at a temperature and for a time effective to fuse them into a unitary, porous cathode current collector.

2. A process according to claim 1 wherein the catalyst is a member selected from the group consisting of gold, platinum, carbon black, nickel oxide, and copper sulfide.

3. A process according to claim 1 wherein the thermoplastic polymer comprises polytetrafluoroethylene.

4. A process according to claim 1 wherein the finely-divided catalyst and polymer are dispersed in the liquid vehicle by applying ultrasonic energy to a mixture of the catalyst layer dispersion ingredients.

5. A process for preparing a cathode current collector for use in a primary electrochemical cell comprising an oxidizable anode material; a cathode current collector comprising a layer of finely-divided catalyst for reducing the solvent; an electrolytic solution, in contact with the anode and cathode current collector, comprising a reducible soluble cathode and an electrolyte solute; wherein the process comprises:

providing an inert, electrically-conductive substrate;

preparing a bonding layer dispersion comprising a liquid vehicle, a finely-divided thermoplastic polymer and a minor amount, based on the weight of the polymer, of an inert, electrically-conductive material;

forming a bonding layer on the substrate in a plurality of cycles by alternately applying a thin layer of the bonding layer dispersion to the surface of the substrate and drying to remove the liquid until a thickness of at least 5 micrometers is built up;

preparing a catalyst layer dispersion comprising a liquid vehicle, a finely-divided catalyst and a minor amount, based on the weight of the catalyst, of a thermoplastic polymer;

forming a catalyst layer on the bonding layer in a plurality of cycles by alternately applying a thin layer of the catalyst layer dispersion to the bonding layer and drying to remove the liquid until a thickness of at least 25 micrometers is built up; and heating the substrate, the bonding layer, and the catalyst layer at a temperature and for a time effective to fuse them into a unitary, porous cathode current collector.

6. A process according to claim 5 wherein the thermoplastic polymer comprises polytetrafluoroethylene and the catalyst is a member selected from the group consisting of gold, platinum, carbon black, nickel oxide, and copper sulfide.

7. A process according to claim 5 wherein the surface of the substrate is made more receptive to bonding by roughening prior to applying the bonding layer.

8. A process according to claim 5 wherein the bonding and catalyst layer dispersions are prepared by dispersing the solid components in the liquid vehicle for each phase by ultrasonic energy, and the dispersion is applied to the substrate by spraying.

* * * * *